Oct. 29, 1935.  P. ALLEN  2,018,908
PRUNING TOOL
Filed Jan. 21, 1933
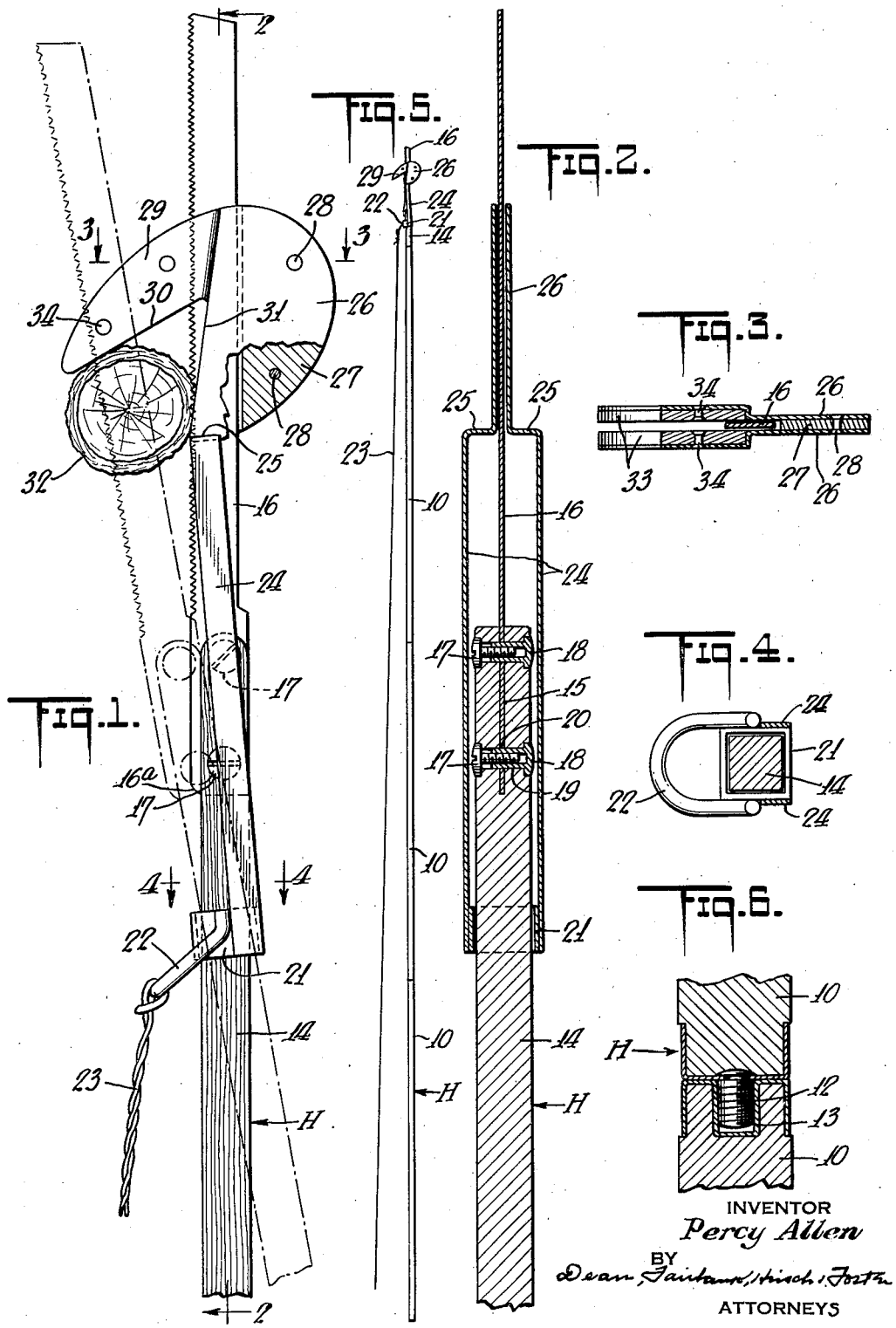
INVENTOR
*Percy Allen*
BY
ATTORNEYS Patented Oct. 29, 1935

2,018,908

UNITED STATES PATENT OFFICE 2,018,908

PRUNING TOOL

Percy Allen, Oakland, Maine

Application January 21, 1933, Serial No. 652,808

8 Claims. (Cl. 30—11)

While certain features of my present invention are capable of embodiment in tools having a wider range of usefulness the invention is particularly concerned with improvements in tree pruning tools.

An object of the invention is to provide a device of this character with which even the most flexible branches or portions thereof may be quickly and conveniently severed even though such branches are out of reach of an ordinary saw.

Another object is to provide a tool of this character having an extensible handle which will permit the tool to reach branches high above the ground yet a tool in which the ease of manipulation is but negligibly lessened as the length of the handle is increased.

Another object is to provide a long-handled pruning tool with which the most limber limb may be sawed off as readily as a heavier relatively rigid limb, the tool being inherently capable of exerting sufficient tension on a flexible branch to hold it against swaying or springing during the sawing operation.

Other objects are to provide a tool of light weight, conveniently portable, simple and practical in construction, rugged and durable in use, composed of but few and inexpensive parts which are readily assembled and designed to permit convenient removal and replacement of the cutting element or any other part subject to wear.

More specifically the device is devoid of complex limb gripping structures, power multiplying lever trains, movable gripper jaws and other unwieldy, unnecessary moving parts which prior inventors have deemed essential in tools designed for generally similar purposes and which have made prior tools not only needlessly heavy but difficult and awkward to operate.

As opposed to prior devices replete with pivot pins, rocker structures, trigger release mechanism etc., the device of the present invention uses essentially but four simple parts only one of which is movable with respect to the others.

Another object is to provide a tool in which no special mechanism need be used for forcing the cutter against the work since my tool simply as an incident of its normal method of use assures the desired pressure of the saw against the limb to be cut and the further a flexible branch is bent to steady it, the more firmly is the saw urged against the work.

In accordance with a preferred embodiment of the invention the tool includes a handle member (preferably of light material and readily extensible). The saw is removably secured to and projects beyond one end of the handle member. A third element mounted for limiting sliding movement and slight rocking movement on the handle serves the three-fold function of a branch engaging and retaining member, a saw guide, and a tension applying device to take the spring out of limber branches.

In accordance with one form of the invention this member includes a pair of arms straddling the handle and saw and rigidly parallelly connected to one side of a ring or band member having limited sliding movement on the handle and of sufficiently greater size than the handle to permit limited rocking of the arms with respect to the handle. These arms at their free ends are preferably shaped to afford closely spaced saw guiding plates which extend beyond the toothed edge of the saw in the form of a branch engaging hook having a V-shaped branch receiving portion to accommodate branches of various sizes up to say four inches or more in diamter. The hook forming portions of the plates are preferably spaced slightly apart to accommodate wooden wear plates which prevent the saw teeth from becoming worn or broken by contact with metal guide members. An extension of that side of the ring or band most remote from the anchorages of the parallel arms is adapted to be attached to a flexible device of sufficient length to be grasped with one hand by the operator while holding the handle in his other hand.

In operation the hook is engaged over the limb to be severed. The flexible device is pulled to cause the hook to tension the limb and hold it against swaying. With the limb thus held the handle is reciprocated causing the guided saw to sever the limb. During sawing the work and saw are forced toward each other by the camming action of the V jaw on the limb.

The invention may be more fully understood from the following description in connection with the accompanying drawing, wherein:

Fig. 1 is a side elevational view of a tool embodying the invention showing the handle broken away, and also showing in cross section a limb about to be severed, Fig. 2 is a longitudinal sectional view on the line 2—2 of Fig. 1, Figs. 3 and 4 are transverse sectional views on the lines 3—3 and 4—4 of Fig. 1, Fig. 5 is a greatly reduced perspective view of the tool showing several handle sections in use, and Fig. 6 is a sectional detail showing one manner in which the handle sections may be joined together.

The tool handle H may include any suitable number of sections 10 removably joined in end to end relationship in any suitable manner such for instance as by screwing a threaded stud 11 at the end of one handle section into a complementary threaded socket 12 in the end of an adjacent section. Telescopic or other connections may be substituted if desired and that section carrying the saw 13 is preferably of rectangular cross section as indicated at 14 at least at the outermost end thereof for a purpose which will more fully hereinafter appear.

The end of the handle is longitudinally slotted at 15 to receive the end of saw blade 16, the latter being removably secured in the slot as by complementary headed screw and socket members 17 and 18 extending through openings 19 in the handle and through apertures 20 in the saw blade.

A band member 21 of shape corresponding to the cross sectional shape of handle portion 14 fits loosely thereon, sliding movement of this band over the end of the handle being prevented by the shoulder 16a afforded by the slight lateral projection of the saw blade beyond slot 15.

At one side of the band member there is rigidly affixed, in any suitable manner, a laterally extending projection 22 here illustrated as a loop to which a flexible device 23 in the form of a rope or sash cord, or light chain may be attached. To what may be termed, for the sake of convenience, the opposite side of the band 21, the ends of a pair of relatively narrow parallel yoke forming arms 24 are rigidly affixed. These arms are spaced apart a sufficient distance to straddle the squared end of the handle member, and the arms at a point beyond the handle member are bent inwardly toward each other as indicated at 25. Beyond the bend 25 the arms increase appreciably in width, merging into integral relatively closely spaced plate portions 26. These plates or plate portions lie closely adjacent the side faces of the saw blade, so that the saw has but limited freedom of lateral movement between the plates. To limit the rocking movement of the yoke element, (including the band, the arms 24 and the plates) in one direction, a spacer member 27 is riveted or otherwise secured at 28 between the plates and engageable with the untoothed edge of the saw blade upon rocking movement of the yoke structure. The same metal which is used to provide the integral arms 24 and plates 26, is also extended laterally in the form of a pair of spaced ears 29. These ears have straight lower edges 30 defining with the straight forward edges 31 of the lower portions of the plates 26, a V-jaw structure adapted to engage a branch or limb to be severed, such branch being indicated in cross-section in Fig. 1 at 32. The ears 29 are substantially offset outwardly from the plane of the plates to which they are integrally joined in order to afford adequate space for the application of a pair of saw edge guide blocks 33 to the inner faces of the hook forming members 29. These blocks are preferably of wood, although other materials might be used, and they are attached to the members 29 by rivets 34 or equivalent devices.

The operation of the device is substantially as follows:

Having joined the proper number of handle sections 10 in accordance with the height of the limb to be severed, the operator holds the handle H in one hand and engaged hook 30, 31 over the limb to be sawed off. With the other hand the operator grasps the end of the flexible device 23, and by a downward pull thereon exerts the necessary tension on the limb, taking the limberness out of it and holding it against swaying or swinging. With the limb thus firmly held, the handle is reciprocated causing the saw to cut through the limb.

It will be observed that the bends 25 or offsets 25 between the arms 24 and the plates 26 serve as stop members to limit downward sliding movement of the band structure and its associated yoke on the squared end of the handle, such offsets cooperating with the end of the handle to check such movement. With the saw blade removed the entire yoke structure may of course be readily slipped off the end of the handle.

The tool is thus of extremely simple, practical construction, substantially devoid of pivots, rocker pins, clamp actuating or retaining mechanism or other complexities.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. A pruning tool of the class described including a handle, a saw blade fixed to and projecting from the end of the handle, a yoke structure including a portion encircling the handle and having limited sliding and rocking movement with respect thereto, said yoke structure including a hook portion adapted to engage a branch to be severed and means including said hook portion affording a guide for reciprocating movement of the saw, that portion of the yoke structure which encircles the handle including a lateral extension and a flexible device attached to said extension.

2. In a tool of the class described a handle, a yoke structure including a portion embracing and rockable and slidable with respect to the handle, a saw blade projecting beyond the end of the handle, said yoke structure including a collar encircling the handle, a pair of arms to straddle the blade, a portion to guide the saw, a hook portion to engage over the branch to be severed, and a flexible device for rocking the yoke structure and capable of acting through the yoke structure to tension a limb to be severed.

3. In a tool of the class described a handle, a yoke structure including a portion embracing and independently or compoundly rockable and slidable with respect to the handle, a saw blade projecting beyond the end of the handle, said yoke structure including a pair of arms to straddle the blade, a portion to guide the saw and a hook portion to engage over the branch to be severed, said handle having a slit in the end thereof and said saw blade having an end removably secured in said slit, said blade end limiting the sliding movement of the yoke structure in one direction.

4. In a tool of the class described a handle, a yoke structure including a portion embracing and independently or compoundly rockable and slidable with respect to the handle, a saw blade projecting beyond the end of the handle, said yoke structure including a pair of arms to straddle the blade, a portion to guide the saw and a hook portion to engage over the branch to be severed, said handle having a slit in the end thereof and said saw blade having an end removably secured in said slit, said blade end limiting the sliding movement of the yoke structure in one direction, the arms including inwardly offset portions limiting the sliding movement of the yoke structure in the other direction with respect to the handle.

5. A pruning tool of the class described including a handle, a saw blade fixed to and projecting from the end of the handle, a yoke structure including a portion encircling the handle and having limited sliding and rocking movement with respect thereto, said yoke structure including a hook portion adapted to engage a branch to be severed and means including said hook portion affording a guide for reciprocating movement of the saw, said hook including a pair of spaced metallic blades and wooden blocks secured to the inner faces of said blades providing a guide for the toothed edge of the saw.

6. A pruning tool of the class described including an elongated handle having a squared end, a saw blade fixed to and projecting from the end of the handle, a yoke structure including a portion of squared cross-section encircling the handle but sufficiently large to permit limited rocking movement with respect to the handle, said yoke structure having limited sliding movement with respect to the handle and including a hook portion adapted to engage a branch to be severed, and means including said hook portion affording a guide for reciprocating movement of the saw.

7. A pruning tool of the class described including a handle, a saw blade fixed to and projecting from the end of the handle, a yoke structure including a portion encircling the handle and having limited sliding and rocking movement with respect thereto, said yoke structure including a hook portion adapted to engage a branch to be severed, means including said hook portion affording a guide for reciprocating movement of the saw, that portion of the yoke structure which encircles the handle including a laterally and downwardly extending bail and a flexible device attached to said bail.

8. In a tool of the class described a handle, a yoke structure including a portion embracing and rockable and slidable with respect to the handle, a saw blade projecting beyond the end of the handle, the handle embracing the portion of the yoke structure comprising a squared collar, a pair of arms to straddle the blade secured in parallel relationship adjacent one side of the collar, a portion to guide the saw, a hook portion to engage over the branch to be severed, a flexible device for rocking the yoke structure and capable of acting through the yoke structure to tension a limb to be severed and means projecting from the collar at the side opposite the collar part to which the arms are attached and through which said yoke structure is attached to the flexible device.

PERCY ALLEN.